Figure 1A:
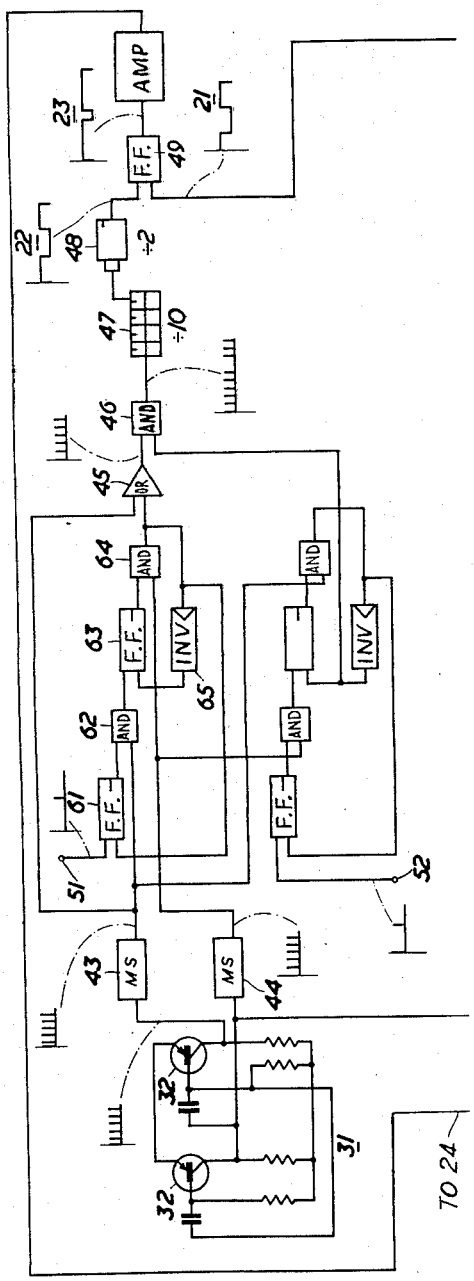

INVENTORS
BEAUMONT J. DAVIES
CLIVE WALLIS
BY
Watson, Cole, Grindle & Watson
ATTORNEYS Feb. 25, 1964     B. J. DAVIES ETAL     3,122,686
POSITION SIGNAL GENERATING APPARATUS
Filed Aug. 4, 1960     5 Sheets-Sheet 5
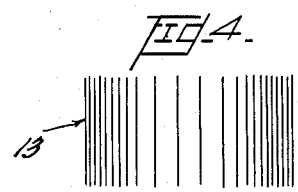
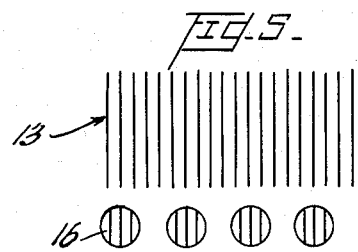
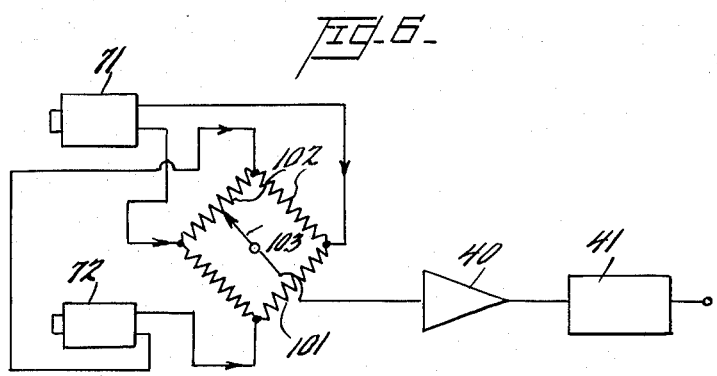
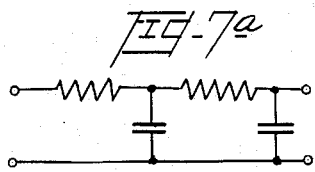 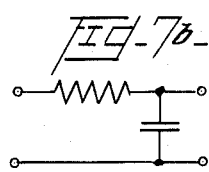
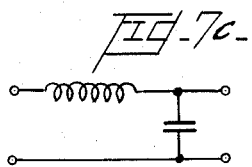 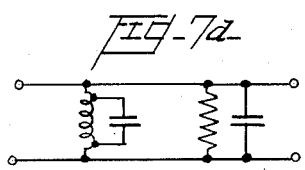
INVENTOR
Beaumont J. Davies
BY Clive Wallis
Watson, Cole, Grindle & Watson
ATTORNEY

United States Patent Office 3,122,686
Patented Feb. 25, 1964

3,122,686
POSITION SIGNAL GENERATING APPARATUS
Beaumont John Davies, Putnoe, Bedford, and Clive Wallis, Solihull, England, assignors to George Richards & Company Limited, Altrincham, England, a company of Great Britain
Filed Aug. 4, 1960, Ser. No. 47,545
Claims priority, application Great Britain Aug. 7, 1959
11 Claims. (Cl. 318—18)

This invention relates to position signal generating apparatus which may for example be used as a position pickup in a servo system for controlling a machine tool.

According to the invention, position signal generating apparatus for generating a signal dependent upon the relative positions of two members includes means arranged to produce a space pattern of a cyclically varying quantity and a detector of the quantity, the relative positions of the pattern and the detector being dependent upon the relative positions of the members, the detector having $n$ detector units spaced apart in the area of the space pattern so that they detect the quantity at positions where the phase of the pattern is different, switching means cyclically operated to obtain from the detector units an output which is a combination of the outputs representing the quantity detected by each of the $n$ units, and a comparator for comparing the combined output with a signal related to the switching cycle.

In this specification the expression "switching" includes both conventional electronic switching on and off and modulation by square wave forms having any suitable mark-space ratio, that will have the effect of producing an output with square-wave component whose amplitudes are dependent upon the initiation outputs of the detectors. For example, a detector output signal could be inverted every half switching cycle in a push-pull arrangement.

The arrangement enables an electrical signal to be obtained which has a frequency equal to the frequency of the switching cycle and a temporal phase dependent upon the spatial phase of the space pattern.

The phases at the positions of the different units (other than the first) could be displaced from the phase at the first position by $1/n+A$ cycles of the space pattern; $(2/n+B)$ cycles; $(3/n+C)$ cycles; etc., where A, B, C . . . are integers which may be zero. These phase displacements are not critical.

Conveniently, the comparator may investigate the temporal relationship between corresponding occurrences in the two signals, for example, the instants when the signals change sign.

The output from the comparator may be used to give an indication or other measure of the sense and magnitude of the relative displacement of the two members, or the output could be used in a servo system to adjust the relative positions of the two members until the output is zero.

The number of detector units $n$ must be at least two, and it is better if it is at least three. However, it is preferred that $n$ is an even number greater than two. The varying quantity in the space pattern may conveniently be the intensity of illumination of a moire fringe pattern derived from a pair of relatively-movable gratings (which may be transmission gratings, or of which one may be a reflection grating) one of which is slightly skewed in relation to the other, or of a vernier fringe pattern derived from two gratings with slightly different uniform spacings between the lines. However, the invention is not limited to patterns derived from the relative position of two members such as gratings and the varying quantity could be derived from a recorded optical or other pattern which is movable in relation to a direct-reading detector.

Each detector unit of such a direct-reading detector may include means for sensing a portion of the recorded pattern the portions detected by the different units being out of phase with each other. Of course, each detector unit may sense two or more similarly-phased portions of the pattern. For example the recorded pattern may be an optical grating and each detector unit may include an additional portion of a similar transmission grating suitably disposed to collect light from similarly phased portions of the first grating.

In the case of an optical pattern, or pattern of electromagnetic radiation near the visible frequency range, each detector unit includes a photo electric device, but of course the varying quantity can be a magnetic field, or an electric field, which varies cyclically in intensity in a space dimension and then each detector unit might be a magnetic recording head or an electro-static instrument.

A cyclic magnetic pattern may be established on a length of magnetic tape and moved to and fro with the movement of one of the members.

A cyclic electromagnetic pattern can take the form of a standing wave train on transmission lines or in a wave guide which is moved bodily with one member, the detector, which could take the form of a suitable set of $n$ probes, being attached to the other member.

Other kinds of space patterns of a cyclically varying quantity, for example where the quantity is electromagnetic acoustic, thermal, or mechanical, will readily come to mind and will not be discussed in more detail here.

The space pattern itself need not extend linearly but may be of a polar nature with the repeated cycles occurring in angular order around a pole and this arrangement is very suitable where the relatively movable members are of this nature, for example where they comprise an instrument dial and a rotating pointer, or parts of a dividing head.

The cyclic switching may actually switch the detector units, and then $n$ relatively time-phase-displaced square wave switching signals may be generated and applied to the various detector units. The square wave switching signals could be derived by the use of pulse dividers from a source of pulses from which source the signal related to the switching cycle is also derived. Alternatively the square wave switching signals could be obtained from a recording on tape.

In another form of the invention, the space pattern is set up by two or more lamps which are controlled by the switching means so that each causes a photo-electric detector unit to be excited in response to a different part of the space pattern in a different part of the switching cycle.

The switching means may be arranged so that each unit or lamp is switched for an equal part of the switching cycle, the parts commencing at appropriately-spaced moments in the cycle. For example if there are four photo-electric units each may be switched on for a ¼ or a ½ of the switching cycle.

The combined output signal can be filtered to extract a wave with the frequency of the switching cycle and a phase dependent upon that of the space pattern. The filter may be tuned to or near this frequency, but preferably an integrator, a band-pass filter, or a low-pass filter is used. The filter should have a phase shift substantially independent of frequency over the frequency range required.

Figure 1B:
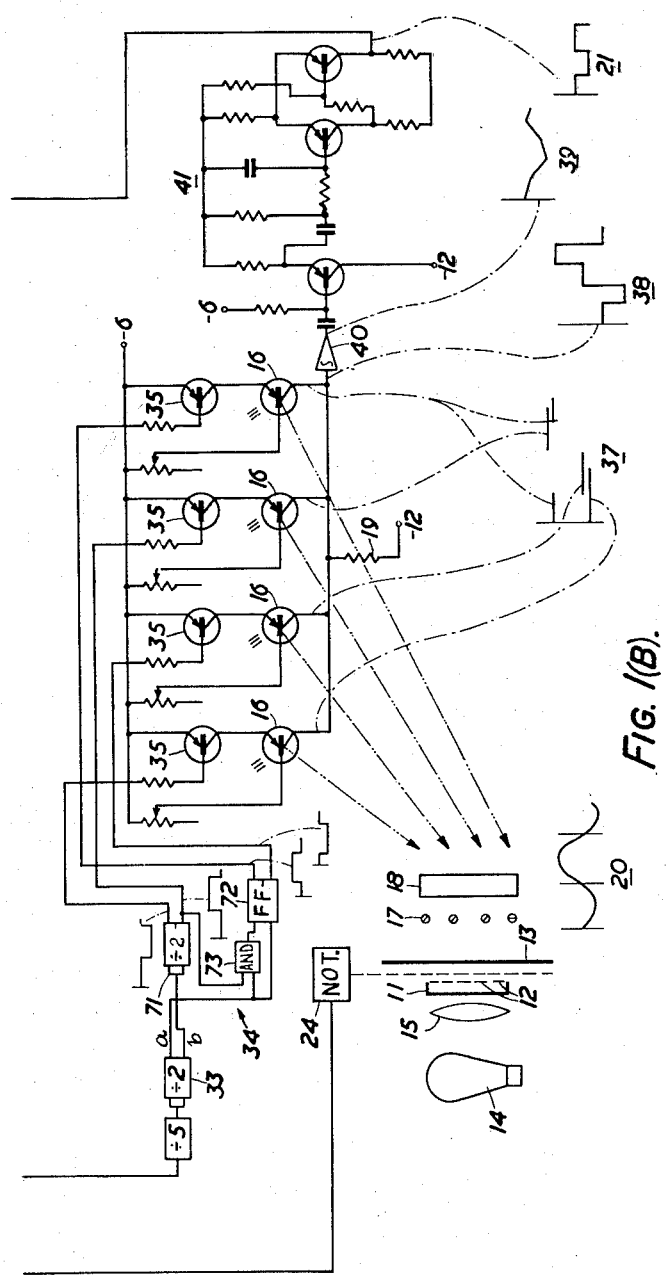
Figure 2:
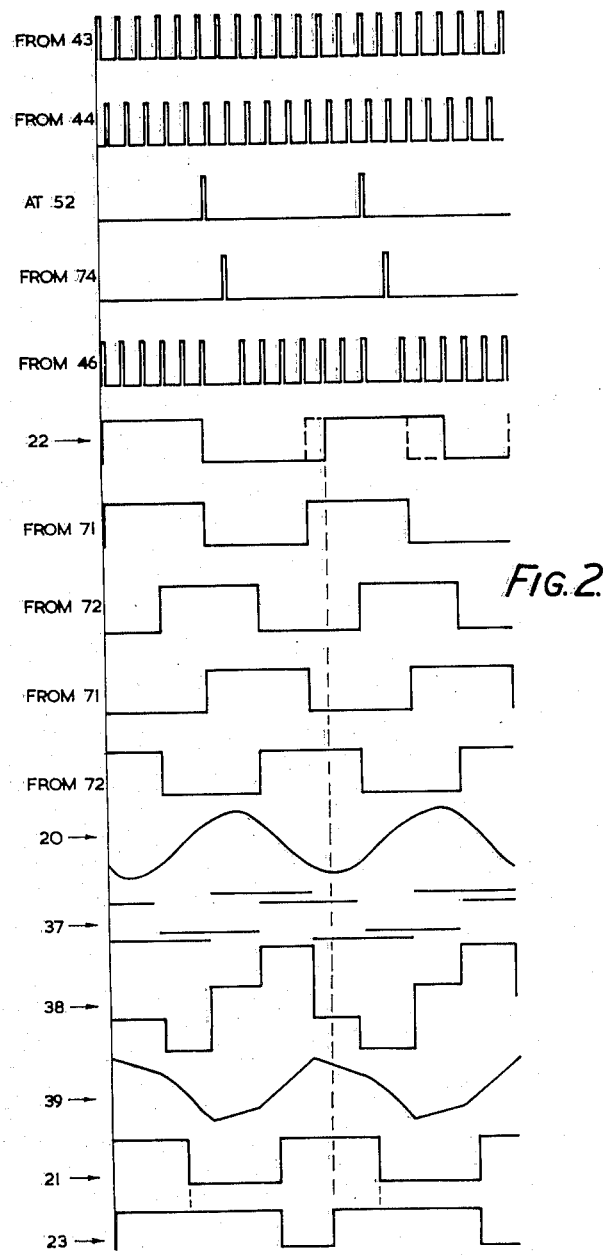
Figure 3:
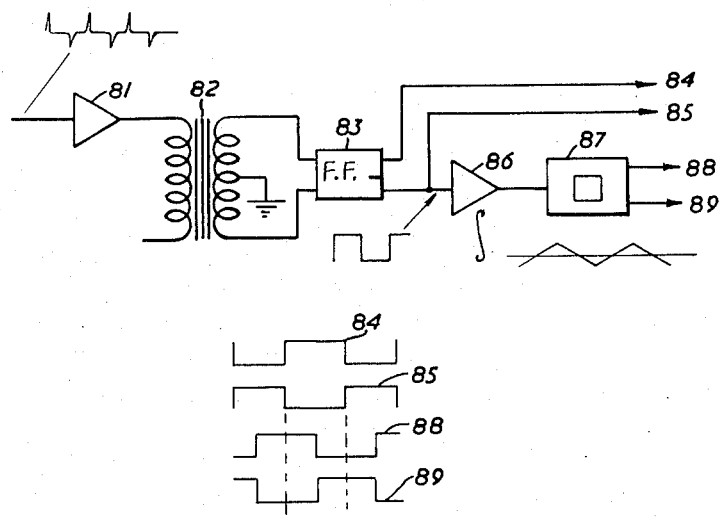

The invention may be performed in various ways, and one particular embodiment of the invention as applied to the control of a machine tool, will now be described by way of example with reference to the drawing accompanying the provisional in which:

FIGURES 1A and 1B comprise a general schematic lay-out of the control equipment, and FIGURE 2 is a diagram of the voltage wave form at parts of the lay-out, FIGURE 3 is a circuit diagram of an alternative part of the apparatus, and FIGURES 4 and 5 illustrate grating patterns, FIGURE 6 is a modified wave generator, and FIGURES 7A to 7D are filter arrangements.

*General Arrangement*

Attached to one part of the machine tool (not shown), for example the bed, is a short diffraction grating 11 mounted in a plane parallel with the direction of movement of the slide of the machine tool and with its lines 12 perpendicular to its direction of movement. Attached to the slide of the machine tool is a long diffraction grating 13 which is mounted in a plane parallel to and slightly spaced from that containing the short diffraction grating 11. As the slide of the machine tool moves, the long diffraction grating typically having a configuration such as shown in FIGURES 4 and 5, moves past the short diffraction grating. FIGURE 4 shows the grating arrangement where the detector unit pattern will be out of phase, whereas FIGURE 5 shows the grating arrangement such that the detector unit pattern may be similarly phased.

Mounted on one side of the short grating 11 is a lamp 14 which shines through a lens 15 onto the short diffraction grating. On the other side of the long grating are mounted four photo-transistors 16 in line, and light from the lamp 14 passing through the two gratings 11 and 13 passes through four adjustable shutters 17 and a cylindrical type lens 18 onto the photo transistors 16. The shutters 17 are used to adjust the amount of light received by individual photocells to compensate for variations in light sensitivity of the photocells to ensure that they are all of equal effective sensitivity.

The interference pattern 20 is approximately sinusoidal with a phase displacement depending upon the position of the slide. The four photo-transistors 16 are spaced apart by distances corresponding to one quarter wavelength of the pattern.

The four photo-transistors 16 are mounted in parallel and serve to drive a common load 19, and means which will be described below are provided for switching the photo-transistors across the load cyclically and in succession, each photo-transistor being switched in for an equal part of the cycle. In the particular embodiment being described, each photo-transistor is switched in for half of each complete cycle but could be switched in for a quarter or some other fraction of a cycle. By virtue of the photo-transistors, being connected in parallel across a common load, the resulting signal will contain a component at the frequency of the switching signal and whose phase depends upon the relative positions of the two gratings. This component is extracted in a suitable filter and squared as will be described below. The resulting signal 21 constitutes a position signal whose phase is a measure of the actual position of the machine tool slide. By means which will be described below, this position signal is compared with a command signal 22 at the same frequency which is phase-modulated to indicate a desired movement of the slide of the machine tool. The comparison of the position signal and the command signal is effected in such a way that an error signal 23 is produced whose D.C. component is dependent upon the phase mismatch and thus on the difference between the actual and the desired positions. This error signal 23 is fed back to a motor 24 arranged to drive the slide until the error signal is zero.

If due to the fineness of the diffraction gratings 11 and 13 the distance represented by one cycle of the error signal 23 is smaller than is required by the servo system, this distance can be multiplied by a factor by dividing the command signal 22 and the position signal 21 by that factor before phase comparison.

*Source of Signals*

Both the command and photocell switching signals are derived from a common 10 kilocycles per second multi-vibrator 31 employing two transistors 32.

The output from one transistor is used to provide the switching signal and is connected to a decade counter 33 working in a 5121 code to produce a 1 kilocycle per second signal, which is fed through a switching circuit 34 which produces four square-wave switching voltages all of the same frequency of 500 cycles per second but advanced in phase by 90° from each other and of constant phase rotation. These signals are fed each to one of four switching transistors 35 which are in turn connected to the four photo-transistors 16 so as to switch each photo-transistor in during the marks of a different one of the square-wave switching voltages to supply to the common load 19 a signal 37 which is composed of four components each component corresponding to the illumination of the photo-transistor concerned.

All the photo-transistors 16 and the switching transistors 35 are operated under similar base bias conditions so that the effects of thermal drift tend to cancel. Potentiometers in the base circuits of the photo-transistors are used to balance the dark currents. The signal 38 resulting from the sum of these four signals 37 is fed through an integrator circuit 40 to produce a wave form 39 which is A.C. coupled to a Schmidt trigger circuit 41. This produces the position signal 21, a square-wave with marks corresponding to the positive half of the wave-form 39 which is of the same frequency as the switching signals but whose phase is a measure of the relative positions of the two gratings.

Although the wave forms 38 and 39 have been shown in FIGURE 1 of the drawings the combination of the four outputs from the detector units and the integration and summing can be combined so that nowhere do the wave forms 38 and 39 actually exist.

The command signal is also derived from the multi-vibrator 31 the two outputs from which are fed through respective mono-stable circuits 43 and 44 which are arranged each to produce a series of output pulses, the pulses from the circuit 44 being intermediate between or shifted in phase by 180° from the pulses from the circuit 43.

These latter pulses from the circuit 43 are fed by way of an OR logic element 45 and a AND logic element 46, the purpose of which will be described below, to a decade counter 47 arranged to divide by ten and a flip-flop circuit 48 arranged to divide by two to produce the square command signal 22 consisting of marks corresponding to the duration of ten of the pulses supplied to the decade counter 47 followed by spaces corresponding to the next ten pulses and so on.

The position signal 21 and the command signal 22 are thus square waves of the same frequency with a phase displacement depending upon any difference between the position of the slide of the machine tool and the desired position as determined by the command signal 22.

A flip-flop circuit 49 to whose two inputs the signals 21 and 22 respectively are supplied produces an output signal 23 depending upon this phase difference which, as has been described above, is used to correct the position of the slide.

When it is desired to move the slide forwards or backwards it is necessary to advance or retard the phase of the command signal 22 and accordingly a command pulse is supplied at terminal 51 or terminal 52 in accordance with the desired direction of movement.

This pulse is synchronised with the next following pulse from the mono-stable circuit 44 or 43 as the case may be in a manner to be described below.

If the slide is to be moved forwards the command pulse is supplied to the terminal 51 and is synchronised with the next pulse from the mono-stable circuit 44 so that it will appear at the input to the OR logic element 45 midway between successive pulses from the mono-stable circuit 43 because the pulses from the circuit 44 are themselves so displaced from the pulses in the circuit 43.

The AND logic element 46 will receive one additional pulse at its input from the OR element 45 in consequence of this forward command pulse.

The result is that the combined counter 47, 48 will advance the phase of the command signal 22 by 1/20 of the cyclic time of the error signal 23 because during a period in which twenty pulses are emitted from the mono-stable circuit 43, twenty-one pulses are fed into the combined counter 47 and 48.

If it is desired to move the slide backwards the command pulse is supplied at 52 and is synchronised with the next following pulse in the train from the mono-stable circuit 43 and is inverted and supplied at the other input to the AND logic element 46. This logic element 46 passes pulses which are supplied at either input provided that two such pulses occur together.

Accordingly in response to a backward command pulse at 52 a pulse will be extracted from the train derived from the output of the mono-stable circuit 43 to be supplied to the decade counter 47.

A backward command pulse at 52 will cause the command signal 22 to be retarded in phase by 1/20 of the cyclic time of the error signal 23 due to the counter having to count one further pulse because of the pulse which has been omitted.

The servo feed-back system will then act in the usual way to drive the slide into the position in which the position signal 21 corresponds in phase with the new command signal 22.

Continuous movement of the slide can be effected by supplying a series of forward or backward command pulses to the terminals 51 or 52 and it is only necessary to ensure that these pulses do not have a pulse repetition rate faster than the pulse repetition rate from the mono-stable circuit 43.

*Synchronisation Circuit*

There are two synchronisation circuits. Each is for synchronising a command pulse with the next pulse appearing at the output of one of the mono-stable circuits 43 and 44 and since the two circuits are identical one only will be described here.

The positive command pulse supplied at the terminal 51 is connected to one input of a flip-flop circuit 61 to set this flip-flop 61 to have unit output. This unit output is applied to one input of an AND logic element 62 whose other input is supplied with the pulses from the monostable circuit 43 and it is clear that when the next pulse from the circuit 43 arrives an output pulse will be delivered from AND input element 62 because both inputs are energised.

The output is connected to set a second flip-flop 63 to give unit output for connection to a second AND logic element 64 which is also supplied with the pulses from the mono-stable circuit 44.

Thus when the next pulse from the mono-stable circuit 44 arrives it will produce an output from the AND logic element 64 to be supplied to the second input of the OR logic element 45. Of course if there had been no command pulse at the terminal 51 no pulse from either circuit 43 or 44 would produce an output from its AND element 62 or 64 and it is only when a command signal is supplied that an additional pulse is fed into the main train of pulses from the circuit 43 at the OR element 45 in synchronism with a pulse from the circuit 44.

A pulse appearing at the output of the AND logic element 64 is fed back to the two flip-flops 61 and 63, the path of the flip-flop 63, being by way of an inverter 65, to reset these flip-flops to zero output in preparation for the next command pulse.

If the command pulse applied at 51 occurs at about the same time as the end of a pulse in the train generated in the mono-stable circuit 43 the AND logic element 62 may not clearly produce an output pulse. If the pulse does not arrive in time to produce a clear output from the logic element 62 to set the flip-flop 63 to give unit output, the flip-flop may be disturbed but not properly set. The disturbance will die away or a unit output will however be set after a time which is arranged to be less than the time interval between the end of the pulse in the train from the mono-stable circuit 43 and the coming of the next pulse in the train which is applied from the circuit 44 to the second input of the AND logic element 64. By the time the next pulse appears at the AND logic element 64 from the mono-stable circuit 44 the other input to the element 64 will be clearly either unit or zero and if it is zero no pulse will be passed.

However the next pulse from the mono-stable circuit to the logic element 62 will combine with the unit output which is still subsisting at the flip-flop 61 to produce an unmistakable pulse input to the flip-flop 63.

In this way there will be no ambiguity but any random command pulse will be synchronised with one or other of the pulses in the train from the mono-stable circuit.

*The Switching Circuit 34*

This circuit 34 for producing a switching signal in phase relation to the command signal 22 will now be described. It comprises two flip-flops 71 and 72 and an AND gate 73.

Signals appearing at one output (output $b$) of the decade counter 33 which consists of a $\div 5$ followed by a $\div 2$ stage are fed directly to both inputs of the $\div 2$ circuit 71 so that each pulse input causes the output from the divider 71 to change over. Each output from the divider 71 comprises one of the switching voltages for the transistors 35 and it will be appreciated that these switching voltages are 180° out of phase and have the same frequency as the pulses at the output of the flip-flop 48 because the divider 71 acts to divide by two to compensate for the division effected in the flip-flop 48.

One of the outputs from the divider 71 (called for convenience the first output) is connected as an input to the AND gate 73 whose other input receives pulses from the other output (output $a$ which is 180° out of phase with output $b$) of the decade counter 33. The pulses from the output $a$ of the counter 33 and the output from the AND gate 73 are supplied as respective inputs to the flip-flop 72.

Pulses are produced at the output of the AND gate 73 only when pulses appear on both inputs to this gate simultaneously. The "second" output of the flip-flop 72 is set to a 1 when the input from the AND gate 73 goes positive. This occurs when the "$a$" output from the counter 33 goes positive after the first output from the divider 71 has gone positive. In this way the "second" output from the flip-flop 72 must always follow the first output from the divider 71 and so the phase rotation is always the same.

Because the two outputs from the counter 33 are 180° out of phase the transitions of the outputs of flip-flop 72 are 90° out of phase with respect to the transition in the outputs of the divider 71.

*First Modification (FIGURE 6)*

It may be desirable to derive the reference wave directly from the four switching waves for the detector units. These switching waves are indicated as the outputs of the units 71 and 72 in FIGURE 1 and in order to provide a phase adjuster these outputs are supplied in order to the four corners of a resistance bridge 101 having equal arms 102 symmetrically disposed around a cylindrical or other suitable former so that a rotating wiper 103 can be moved to make contact with any point on any of the resistance arms.

By selecting a suitable potentiometer the shaft rotation can be made directly proportional to phase shift. For example, with a square wave switching signal the potentiometer can be linear.

It can be shown that the signal on the wiper will be of the form shown at 38 in FIGURE 1 and that the phase will move with movement of the wiper. If this output is passed through an integrator similar to the integrator 40 and a squaring device similar to the squaring device 41, the output will be a reference wave such as 22 whose phase is dependent upon the setting of the wiper.

Such a phase shifter may be very useful in "setting the zero" of a system utilizing the invention.

Second Modification

The filter circuit 40 from which the wave form 39 is produced is required to establish a frequency component of the same frequency as that of the switching waves used to switch the photo-transistors 16. A simple integrating circuit such as 40 can be used which gives a fairly good approximation to a sine wave and which gives a constant 90° phase shift independent of frequency.

A filter circuit (FIGURE 7B) comprising two series resistors and two shunt capacitances can be made to give a fairly constant phase shift over the necessary frequency range while if the frequency range is small a filter (FIGURE 7B) comprising a single series resistor and a shunt capacitor can be used or possibly a single series inductance and a single shunt capacitor broadly tuned to the switching frequency (FIGURE 7C).

Where the frequency range is larger a band pass filter (FIGURE 7D) may be used which comprises two shunt inductances with manual couplings between them and each in parallel with a capacitor.

Again a low pass filter with cut off a little above the switching frequency may also be used.

As it is possible that the filter used may give an unacceptably large charge of phase shift with frequency the frequency of the wave form 39 can be kept constant and hence the phase shift in the filter can be kept constant in a modification by changing over the inputs of the two decade counters 33 and 47. The photo-transistor switching voltages will now be phase-modulated by the command signal 22, but the resultant error signal is compared with a signal of the same frequency of fixed phase.

This arrangement is satisfactory where only one control is to be effected but if more than one control is to be effected, for example if it is also necessary to control traversing movement of the saddle of a lathe the modified arrangement has the disadvantage that the same set of switching signals cannot be used for both axes.

Alternative Method of Obtaining Square Wave Switching Signals

As shown in FIGURE 3 of the accompanying drawings the switching wave forms for the detector units can be obtained from a square wave which has been recorded on magnetic tape, or which is the output square wave of the phase shaft for "setting the zero."

The magnetic reading head normally used with magnetic tape acts as a differentiator and is responsive to the edges of the recorded square wave and produces an output with alternate positive and negative pulses. These are amplified 81 and fed to the primary winding of a transformer 82 whose centre-tapped secondary winding is connected in a push-pull arrangement to the two inputs of a flip-flop 83. The two outputs from the flip-flop comprise the square switching waves for the first and third detector units as shown at 84 and 85 and one of these outputs is integrated at 86 and then put into square form at 87 to produce the other two switching waves which are a quarter wave displaced from the first two waves as shown at 88 and 89. This arrangement is advantageous because it is not subject to interference and because complicated operations can be effected by previously recorded appropriate command signals on the same or associated tape.

What we claim as our invention and desire to secure by Letters Patent is:

1. Position signal generating apparatus comprising two relatively movable members including means for establishing a pattern extending in space of a varying quantity and for detecting the quantity locally in the pattern, which means comprise a plurality of units sensitive to said quantity and capable of being switched on and off, means for generating a cyclically varying switching signal, means connected to the generating means for switching the units cyclically on and off, means for combining outputs corresponding to all the units to form a combined output, means for generating a reference signal equal in frequency to that of the switching signal, and means for comparing the combined output with the reference signal and for deriving a phase difference signal.

2. Apparatus as claimed in claim 1 in which said units are themselves detectors of the quantity at local positions along the pattern.

3. Apparatus as claimed in claim 2 in which the units are spaced to have a physical separation of each unit (other than the first) from the first unit by distances which resolved along the direction of relative movement are $\lambda/n + A\lambda$, $2\lambda/n$ and $B\lambda$, where $n$ is the number of detector units, A and B are integers which may be zero.

4. Apparatus as claimed in claim 1 including a recorded space pattern which is movable with one of the members in relation to the other.

5. Apparatus as claimed in claim 1 including an optical grating providing the space pattern as a pattern of varying intensity of illumination.

6. Apparatus as claimed in claim 5 including two optical gratings, one arranged to move with each of the movable members and one of which is comprised of a number of parts each associated with one of the units.

7. Apparatus as claimed in claim 1 in which the units are positioned in a line spaced apart in the direction of relative movement of the members.

8. Apparatus as claimed in claim 1 including a source of pulses, means for deriving square wave signals from the pulses, comprising the switching signal and means for deriving from the pulses the reference signal.

9. Apparatus as claimed in claim 1 in which the phase difference signal is arranged to give an indication of the sense and magnitude of the relative displacement of the two members.

10. Apparatus as claimed in claim 1 including a servo-system for adjusting the relative position of the two members and means for supplying the phase difference signal as an input to the servosystem.

11. Apparatus as claimed in claim 10 associated with a machine tool in which the relatively movable members comprise respectively a fixed part and a movable part of the machine tool.

References Cited in the file of this patent

UNITED STATES PATENTS

| | | |
|---|---|---|
| 2,560,337 | Fouassin | July 10, 1951 |
| 2,839,711 | Tripp | June 17, 1958 |
| 2,886,717 | Williamson et al. | May 12, 1959 |
| 2,886,718 | Sheperd et al. | May 12, 1959 |
| 2,939,061 | Keenan | May 31, 1960 |